(12) United States Patent
Takagi (10) Patent No.: US 11,291,213 B2
(45) Date of Patent: Apr. 5, 2022

(54) BLEEDING METHOD FOR FISH AND ROUND FISH PROCESSED THEREBY

(71) Applicant: Hamasui Co., Ltd., Ehime (JP)

(72) Inventor: Kazuya Takagi, Ehime (JP)

(73) Assignee: Hamasui Co., Ltd., Ehime (JP)

( * ) Notice: Subject to any disclaimer, the term of this patent is extended or adjusted under 35 U.S.C. 154(b) by 0 days.

(21) Appl. No.: 17/049,462

(22) PCT Filed: Sep. 26, 2019

(86) PCT No.: PCT/JP2019/037946
§ 371 (c)(1),
(2) Date: Oct. 21, 2020

(87) PCT Pub. No.: WO2021/019795
PCT Pub. Date: Feb. 4, 2021

(65) Prior Publication Data
US 2022/0022473 A1    Jan. 27, 2022

(30) Foreign Application Priority Data
Jul. 29, 2019    (JP) .............................. JP2019-138951

(51) Int. Cl.
*A22C 25/14*    (2006.01)
(52) U.S. Cl.
CPC ................... *A22C 25/14* (2013.01)
(58) Field of Classification Search
CPC .................................................. A22C 25/14
USPC ....................................................... 452/121
See application file for complete search history.

(56) References Cited

U.S. PATENT DOCUMENTS

| 4,976,010 A * | 12/1990 | Lavelle, Jr. .......... A22C 25/145 452/116 |
| 8,585,474 B1 * | 11/2013 | Graham ................. A22C 25/14 452/161 |
| 2021/0298317 A1 * | 9/2021 | Kristensen ........... A22C 25/145 |

FOREIGN PATENT DOCUMENTS

| JP | H09-149761 A | 6/1997 |
| JP | 2005-151875 A | 6/2005 |
| JP | 2010-104356 A | 5/2010 |
| JP | 2019-122292 A | 7/2019 |

* cited by examiner

*Primary Examiner* — Richard T Price, Jr.
(74) *Attorney, Agent, or Firm* — Muncy, Geissler, Olds & Lowe, P.C.

(57) ABSTRACT

A bleeding method for a fish includes step of forming a slit SL that connects pericardial cavity 11 to an outer part of the fish by cutting membrane 16 to split a head and an abdomen such that abdominal aorta 19 is not cut and internal organs incorporated in abdominal cavity 12 are not exposed to an outside air,
  step of spreading the slit such that arterial sphere 18 does not tomozure, and a caudal side surface of ventricle 171 is exposed,
  step of inserting tubular instrument 2 in heart 17, which runs through the spread slit SL from the caudal side surface of the ventricle toward arterial sphere 18, step of fixing tubular instrument 2 to heart 17, and step of discharging blood of the fish outside by press-fitting liquid into vascular system of the fish via tubular instrument 2.

13 Claims, 7 Drawing Sheets

Fig. 7

BLEEDING METHOD FOR FISH AND ROUND FISH PROCESSED THEREBY

TECHNICAL FIELD

The present invention relates to fish's bleeding method of press fitting (tightly inserting something into a tubular object with pressure) liquid into the vascular system, as well as the round fish with reduced fishiness and superiority in maintaining freshness by means of the said fish's bleeding method.

BACKGROUND

Blood inside the fish's body is the root cause of fish's fishiness, and is a contributory factor to accelerate freshness deterioration. Therefore, removing blood inside the fish's body is an extremely important process in order to maintain the quality of the fish.

Conventionally, bleeding method of press fitting liquid into fish's vascular system was performed as a way to maintain quality of processed products which are processed for long shelf life, such as frozen, dried or smoked fish (patent document 1). With this bleeding method, blood can be removed more reliably than bleeding method of simply draining blood out of cut blood vessels because the blood in the vascular system is replaced with another liquid.

Here, in the conventional bleeding method of press fitting liquid into the fish's vascular system, it was common practice to cut open the abdomen of the fish, as shown in patent document 1, upon inserting a tube for press fitting liquid into the vascular system, because it was presupposed that the fish will be processed. For this reason, a fish in which blood has sufficiently been removed was never provided in the form of a round fish, which internal organs are not removed.

However, fish's freshness deterioration progresses immediately after landing, and there is demand for sufficient bleeding method in order to reduce fishiness and improve maintaining freshness, even for round fish, which are distributed within a short time after landing.

RELATED ART

[Patent Doc. 1] JP Laid-Open Patent Application Publication H09-149761

The present invention was made considering such problems. One of the goals of the present invention is to provide round fish with reduced fishiness and superiority in maintaining freshness, as well as fish's bleeding method in order to provide the said round fish.

MEANS TO SOLVE THE DRAWBACKS AND ADVANTAGES

Regarding the first aspect of a bleeding method for fish, it comprises step of forming a slit that connects a pericardial cavity to an outer part of the fish by cutting a membrane of gill to split a head and an abdomen such that an abdominal aorta is not cut and internal organs incorporated in an abdominal cavity are not exposed to an outside air, step of spreading the slit such that an arterial sphere of the fish is not pulled up together with a fresh on an abdominal side being lifted, and a caudal side surface of a ventricle in a heart of the fish is exposed, step of inserting a tubular instrument in the heart of the fish, which runs through the slit from the caudal side surface of the ventricle toward the arterial sphere, step of fixing the tubular instrument to the heart, and step of discharging blood of the fish outside by press-fitting liquid into vascular system of the fish via the tubular instrument. Therewith, while internal organs incorporated in an abdominal cavity are not exposed to an outside air and a round fish status maintains, blood is fully drained from the fish. Thereby, fishiness decreases and it makes possible to provide round fishes that are excellent at maintaining their freshness.

Further, regarding the second aspect of the bleeding method for fish, it comprises step of forming a slit that connects a pericardial cavity to an outer part of the fish by cutting a membrane of gill to split a head and an abdomen such that an abdominal aorta is not cut and internal organs incorporated in an abdominal cavity are not exposed to an outside air, step of spreading the slit such that an arterial sphere of the fish is not pulled up together with a fresh on an abdominal side being lifted, and the arterial sphere of the fish is exposed, step of piercing a tubular instrument in the arterial sphere of the fish in a direction of blood flow via the slit spread, step of fixing the tubular instrument to the arterial sphere, and step of discharging blood of the fish outside by press-fitting liquid into vascular system of the fish via the tubular instrument. With these steps, when inserting tubular instrument in the arterial sphere in the direction of blood flow, the width of the slit can be smaller compare to a case of inserting in the heart. A load on the fish decreases when serving the fish.

Further, regarding the bleeding method for fish, it comprises step of forming a slit that connects a pericardial cavity to an outer part of the fish by cutting a membrane of gill to split a head and an abdomen such that an abdominal aorta is not cut and internal organs incorporated in an abdominal cavity are not exposed to an outside air, step of spreading the slit such that an arterial sphere of the fish is not pulled up together with a fresh on an abdominal side being lifted, and a border vicinity between the arterial sphere and a heart of the fish is exposed, step of cutting the border vicinity between the arterial sphere and the heart of the fish, and inserting a tubular instrument from a cut edge of the arterial sphere, which is created by the cutting, toward the abdominal aorta via the slit, which is spread, step of fixing the tubular instrument to the arterial sphere, and step of discharging blood of the fish outside by press-fitting liquid into vascular system of the fish via the tubular instrument. Therefor, a drawback is avoided that the liquid leaks from damaged locations of walls in the vascular system, and the pressure is not enough conveyed, and the blood is not fully discharged. Further, since the discharge spout of the blood is wider, it is possible to discharge the blood more efficiently.

Further, regarding the fourth aspect of the bleeding method for fish, the step of cutting the slit further includes a step of cutting a part of fresh connecting the head and the abdomen such that the slit and the pericardial cavity is connected within a range on a head side rather than a diaphragm, which separates the pericardial cavity from the abdominal cavity. By the method in which the abdominal aorta is not cut and the internal organs incorporated in the abdominal cavity are not exposed to the outside air, the slit that can be widen enough for the insertion of the tubular instrument is created.

Further, regarding the fifth aspect of the bleeding method for fish, the press-fit liquid is adjusted of which a salt concentration is in a range of 1.8 to 2.2 wt %. Therewith, it suppresses the fresh of fish to turn reddish.

Further, regarding the sixth aspect of the bleeding method for fish, the press-fit liquid has a hydrogen concentration that is in a range of 0.7 to 1.6 mg/L. Therewith, hydrogen, which is a superior reducing agent, runs through the fish's vascular system, which will suppress oxidation of the fish's body tissue, enabling to provide round fishes that maintain freshness.

Further, regarding the seventh aspect of the bleeding method for fish, the press-fit liquid includes at least one selected from antioxidant, washing soap, sanitizing agent, anticoagulant, spice, fruit juice, nutritional supplement and food additive. Therewith, in addition to advantages of the blood breeding process, it provides round fishes that realize advantage(s) corresponding to the characteristic of the press fit liquid.

Further, regarding the round fish with respect to the eight aspect of the invention, the fish is processed to bleed by the above discussed bleeding method. Therewith, it provides round fishes from which blood is fully drained. Namely, it provides round fishes of which fishiness decreases and freshness effectively maintains.lk.

DETAILED DESCRIPTIONS OF THE INVENTION(S)

In the following, embodiments of the present invention are described with reference to the diagrams. However the embodiments shown below are examples of fish's bleeding method and round fish in order to concretize the technical ideas of the present invention, and the present invention is not limited to the following fish's bleeding method and round fish. Further, the present specification by no means limit the members shown in the scope of the patent claim to members of the embodiments. In particular, the dimensions, materials, shapes, their relative placements and the like of the component parts described in the embodiments are not intended to limit the scope of the present invention to only those, unless there is notably a specific description, and are merely descriptive examples. Note that the size, positional relation and the like of the members shown in each diagram are at times exaggerated in order to clarify the description. Further, in the following descriptions, the same names and symbols point to the same or same quality members, hence will omit detailed description as appropriate. Further, each element that configures the present invention can be in the form of one member combining multiple elements by configuring multiple elements with one member, or conversely can be realized by dividing the function of one member with multiple members.

(An Example of the First Embodiment) (the Yellowtail 1)

The present invention is a fish's bleeding method that can be applied to a broad range of fish in general, and is especially suited for farmed fish such as Red Seabream, Greater Amberjack, Yellowtail, and Japanese Amberjack. Here, examples of application to the yellowtail 1 shown in FIG. 1-3 as well as FIG. 5-7 will be described as examples of the embodiments.

Figure 1:
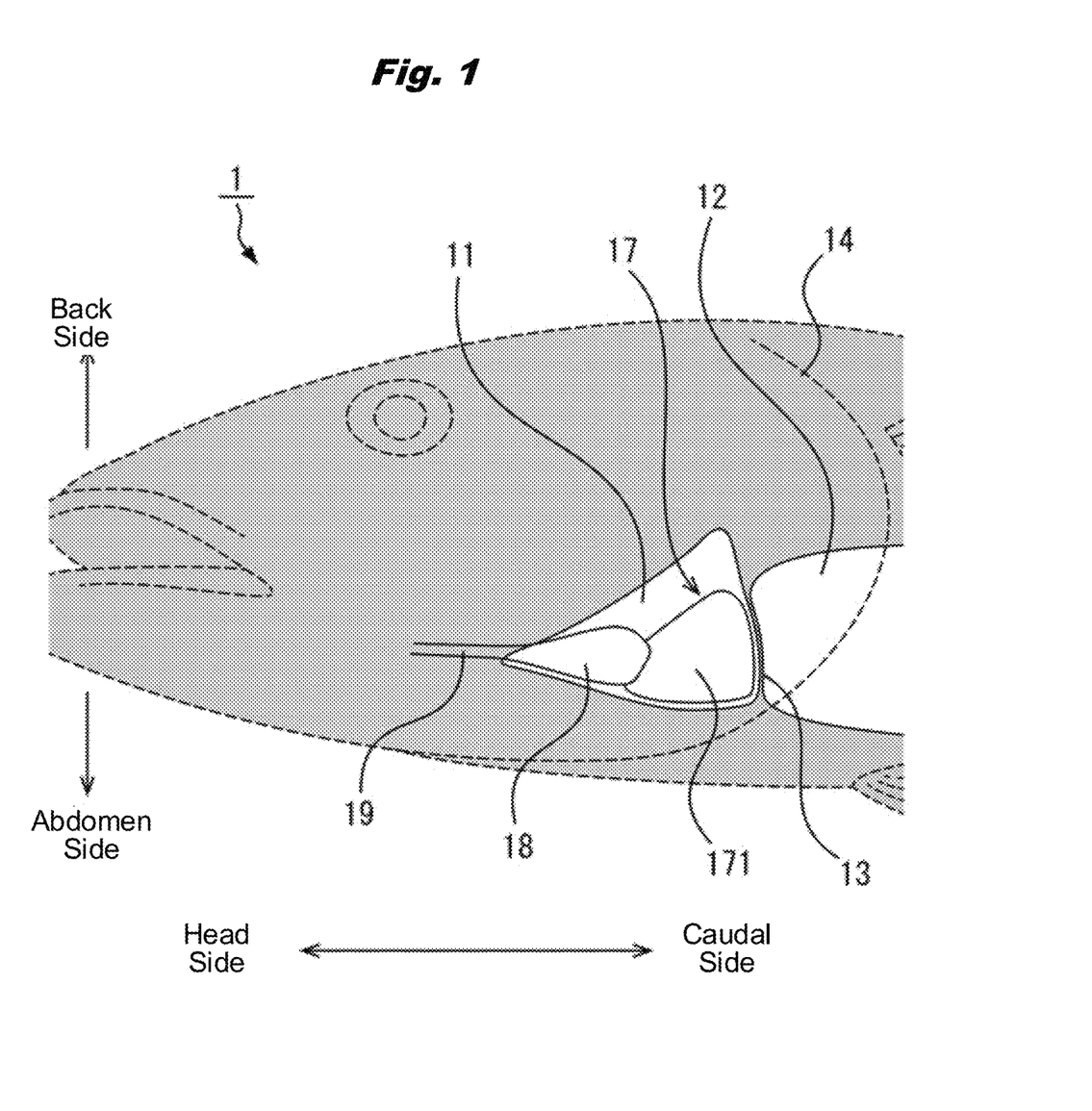
FIG. 1 is an explanatory diagram of the structure inside the body of a yellowtail.
Figure 2:
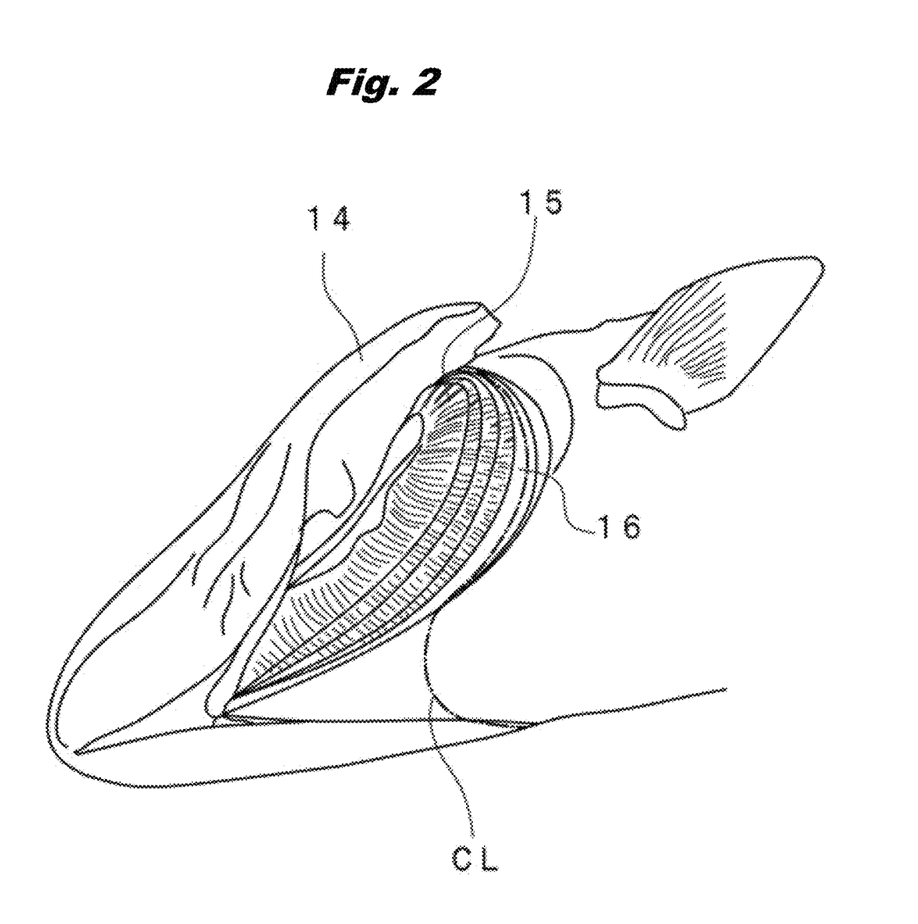
FIG. 2 is an explanatory diagram of the first process with respect to an example of the first embodiment.

FIG. 1 schematically illustrates the yellowtail 1's internal structure around the head with solid lines, and the exterior with dashed lines. Further, the body cavities related to the present invention are shown in white. As shown in FIG. 1, in the back of the gill cover 14 of the yellowtail 1, there exists the pericardial cavity 11, which is the body cavity that incorporates the heart 17, and this pericardial cavity 11 is separated from the abdominal cavity 12, which is the body cavity that incorporates the internal organs of the digestive system, with a thin diaphragm 13.

It is desirable to perform IKE-JIME and SHINKEI-JIME on the yellowtail 1 beforehand. As a specific example of processing the fish, there is the method of first destroying the brain by stabbing the fish between the eyebrows with a pick (IKE-JIME), then destroying the spinal cord by inserting a wire along the spine (SHINKEI-JIME).

(The First Process)

Figure 3:
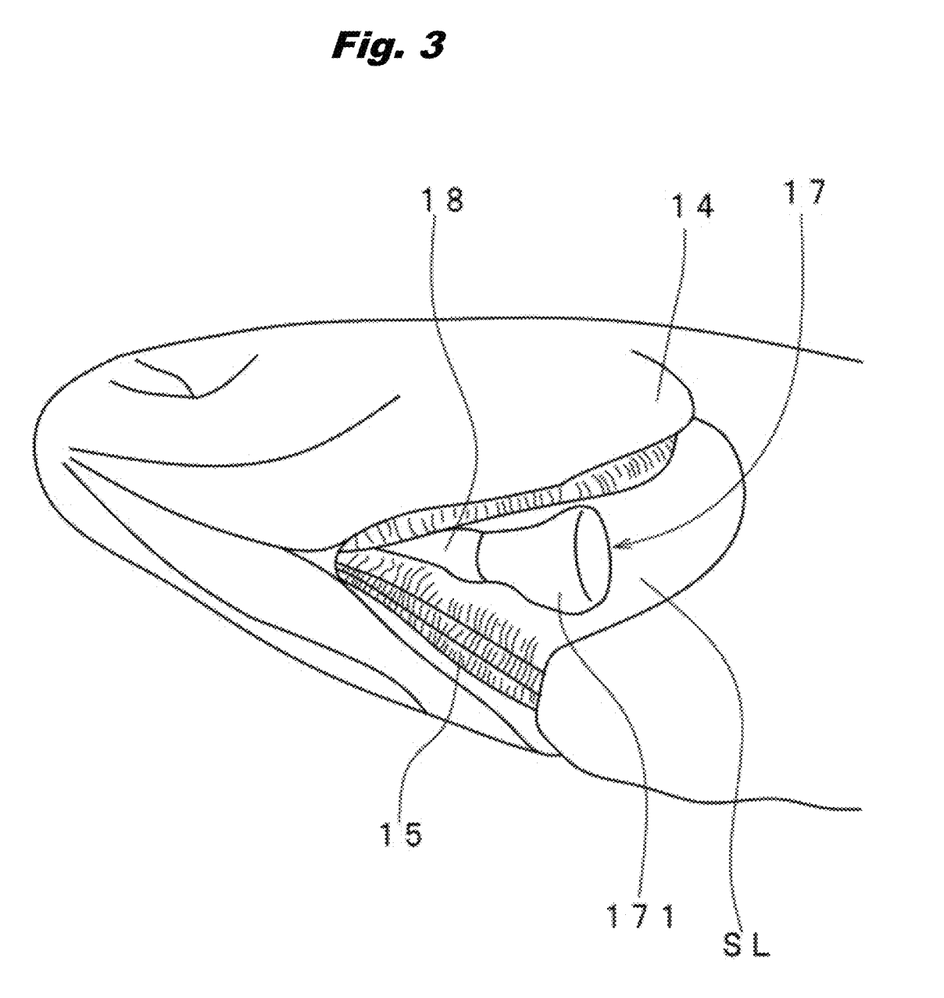
FIG. 3 is an explanatory diagram of the state upon completion of the first process with respect to an example of the first embodiment.

In the example of the present embodiment, as the first process, cut the yellowtail 1's head and abdomen alongside the outer edge of the gill 15. More specifically, lift the gill cover 14 and slit the membrane 16 under the gill 15 alongside the cutting line CL shown in the dash-dotted line in FIG. 2, as well as cut the part of the flesh which connects the yellowtail 1's head and the abdomen. Note that the part of the flesh which connects the yellowtail 1's head and the abdomen is specifically the part on the abdomen side of the pericardial cavity 11 shown in FIG. 1. As such, as shown in FIG. 3, slit SL, which connects the pericardial cavity 11 to the outer side (or outer air surrounding the fish) of the fish, is formed. It is good to spread the formed slit SL so that the caudal side surface of the heart 17's ventricle 171 is exposed.

Here, in the present process, it is necessary to pay attention so as not to cause TOMOZURE of the arterial sphere 18, especially when cutting the part of the flesh of the yellowtail 1. TOMOZURE of the arterial sphere 18 occurs when the knife is inserted in a location that is veered towards the head side of the pericardial cavity 11, and the abdominal aorta 19 shown in FIG. 1 is cut along with the flesh. When the flesh on the abdominal side is lifted in order to open up the slit SL, the status in which the arterial sphere 18 is attached to the inside of the flesh and is lifted up together is called the TOMOZURE of the arterial sphere 18. In this status, when liquid is press fit into the vascular system in the fourth process described below, the liquid leaks from the said cut location, and pressure does not transfer any further from this point. For this reason, the majority of the blood will not be replaced with the liquid and sufficient bleeding cannot be performed.

Further, when cutting the part of the flesh of the yellowtail 1, it is desirable to perform it so that a connecting point (inside the fish's body) of slit SL with the pericardial cavity 11 is within a range on the head side rather than the diaphragm 13. With this cutting method, even if a connecting point of the slit SL with the outer side of the fish (the surface side of the fish's body) is not on the head side rather than the diaphragm 13, a body cavity which is connected to the outer side of the fish's body via the slit SL is limited to the pericardial cavity 11, and the internal organs incorporated in the abdominal cavity 12, which is a body cavity separated from the pericardial cavity 11, will not be exposed to outside air. With such dimension, the remaining process can be performed while suitably maintaining the round status of the fish.

(The Second Process)

Figure 4:
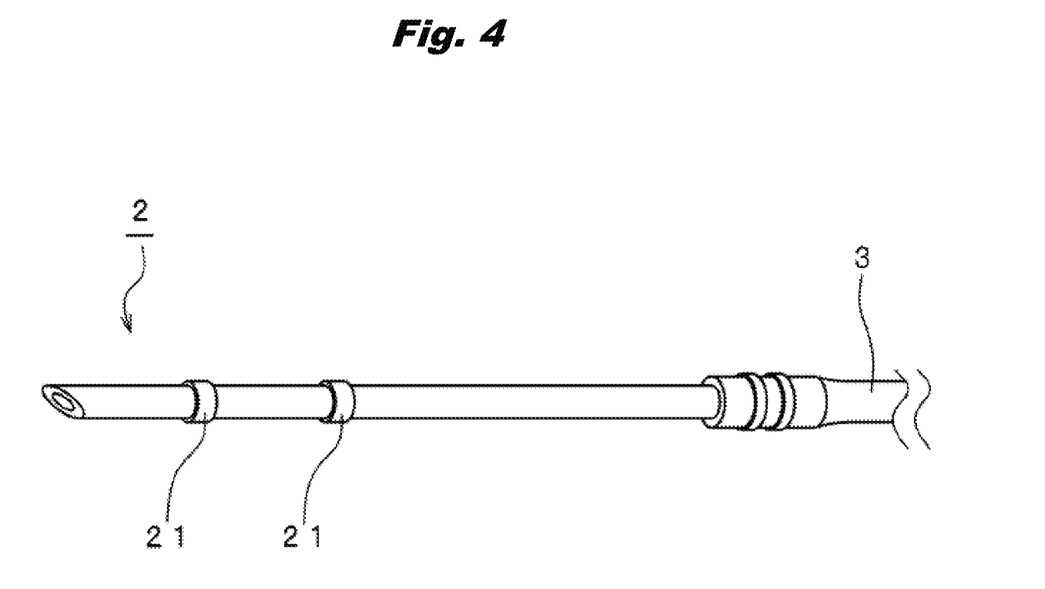
FIG. 4 is a diagram showing one example of a tubular instrument used in the present invention.

In the second process, pierce the injection needle 2 shown in FIG. 4 (equivalent to an example of a "tubular instrument" in the scope of the patent claim.) to the heart 17 through the slit SL.

The injection needle 2 is made of a stainless tube with an external diameter of approximately 3 mm, and protrusions 21 are set at locations that are approximately 20 mm and approximately 40 mm from the tip. The protrusion 21 expands out approximately 1 mm from the surface of the stainless tube, and the features are such that there are no sharp jags and are shaped so that it is difficult to scratch the fish's vascular system. The base end of the injection needle 2 is connected to a pump's outlet via the tube 3 and the like, and dilution water (equivalent to an example of "liquid" in the scope of the patent claim. Details will be described below.) is injected from here.

Note that the tubular instrument does not have to be stainless steel, and can be a material which is hard enough to prick the wall of the ventricle of the fish to be processed, and has corrosion resistance, such as other steel or plastic. Further, the external diameter of the tubular instrument of approximately 3 mm is suitable for fish which weigh over 1.5 kg, yet for fish which are far below 1.5 kg, the size of the heart is also smaller, hence it is good to use a smaller one. In this case, with the protrusions as well, it is good to lower the height of expansion, have it closer to the tip, and set them closer together.

Figure 5:
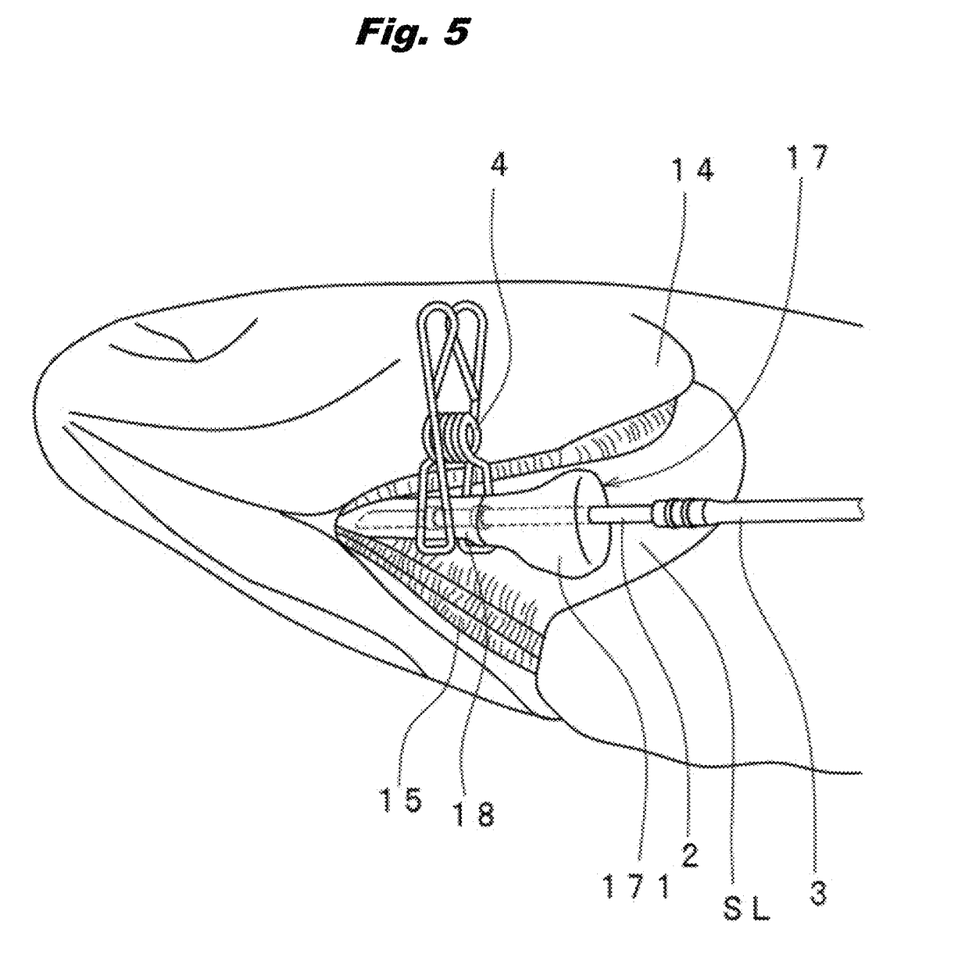
FIG. 5 is an explanatory diagram of the state upon completion of the third process with respect to an example of the first embodiment.

The piercing of the injection needle 2 into the heart 17 is performed from the caudal side surface of the ventricle 171 towards the arterial sphere 18, and as shown in dashed lines in FIG. 5, the depth of the piercing is approximately so that the protrusion 21 reaches the inside of the arterial sphere 18. Here, exercise caution so that the tip of the injection needle 2 does not cut through parts other than the piercing entrance. Note that as long as the direction of the piercing of the injection needle 2 is from the caudal side surface of the ventricle 171 towards the arterial sphere 18, the piercing entrance can be points other than the caudal side surface of the ventricle 171.

(The Third Process)

In the third process, fix the injection needle 2 to the heart 17. Specifically, as shown in FIG. 5, pinch the part where the injection needle 2 is inserted in the arterial sphere 18 with the pinch 4. Here, it is desirable to pinch the location between the two protrusions 21 of the injection needle 2 with the pinch 4.

As such, even if pressure is added to the length direction of the injection needle 2, the injection needle 2 will not slip out of the heart 17, because the protrusions 21 and the pinch 4 are engaged.

(The Fourth Process)

In the fourth process, dilution water is press-fit into the vascular system of the yellowtail 1 via the injection needle 2.

Dilution water is sterilized sea water, such as by ozone sterilization and ultraviolet sterilization, which has been diluted with water. Note that if the sea water cannot be sterilized, water solution in which salt has been dissolved into water can be used in lieu of dilution water. It is suitable to adjust the concentration of the sodium chloride to 1.8-2.2 wt % by diluting water, and even more preferably, adjusted to 2.0 wt %. The fish's flesh tends to become reddish when the concentration of the sodium chloride is below 1.8 wt %, or above 2.2 wt %, so this is to avoid such a trend. Sodium chloride is extremely effective to promote cohesion of the fish's flesh and to improve texture, to improve the suppression effect of the outflow of the drip (sap) from fresh fish and to bring out the umami in the taste.

The press fit of dilution water to the yellowtail 1 is performed at a flow rate of 2 L/minute. This way, there will be high pressure inside the yellowtail 1's vascular system, and blood will discharge mainly from the gaps in the piercing entrance opened up with the injection needle 2 in the heart 17's ventricle 171, as well as the fragile parts of the capillaries of the gill 15. After approximately 5 minutes since starting the press fit, the discharged liquid will become mostly colorless, and it can be confirmed that the blood in the vascular system has been replaced with dilution water.

Note that it is desirable to change the press fitting flow rate depending on the weight of the fish. Flow rate is suitable at 1 L/minute for fish which weigh 2 kg or less (such as Red Seabream), 1.5 L/minute for fish which weigh 2 kg or more and less than 5 kg (such as Greater Amberjack), and 2 L/minute for fish which weigh 5 kg or more (such as Yellowtail or Japanese Amberjack). Following these flow rate standards, blood can effectively be discharged to the outside of the fish's body while suppressing damage to the vascular system caused by press fitting dilution water.

Further, with regard to the duration of the press fit, if the discharging liquid is still showing reddishness after 5 minutes have passed since starting to press fit, press fitting may be extended as appropriate. On the other hand, if the discharging liquid stops showing reddishness before 5 minutes have passed since starting to press fit, press fitting may end earlier.

An Example of the Second Embodiment

Figure 6:
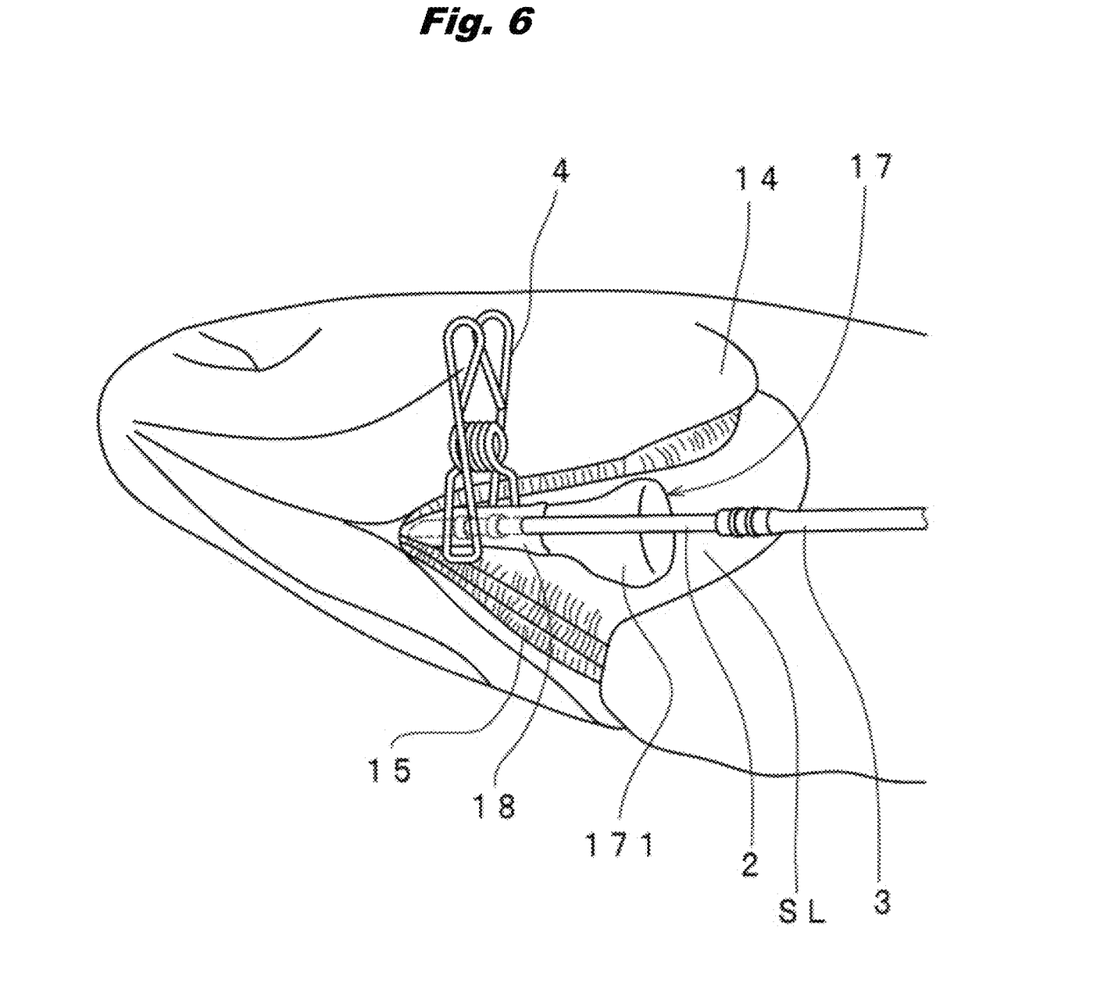
FIG. 6 is an explanatory diagram of the state upon completion of the third process with respect to an example of the second embodiment.

In the aforementioned second process, as shown in FIG. 6, it is possible to set the piercing location of the injection needle 2 to the arterial sphere 18 instead of the heart 17. In this case, it is desirable to pierce the injection needle 2 in the direction of the blood flow. Here, the direction of the blood flow inside the arterial sphere 18 runs from the yellowtail 1's caudal towards the head. Further, in the example of the present embodiment, it is sufficient if the slit SL is open wide enough such that the arterial sphere 18 is exposed, and there is no need to open it as wide such that the caudal side surface of the ventricle 171 is exposed, such as in the aforementioned example of the first embodiment.

An Example of the Third Embodiment

Figure 7:
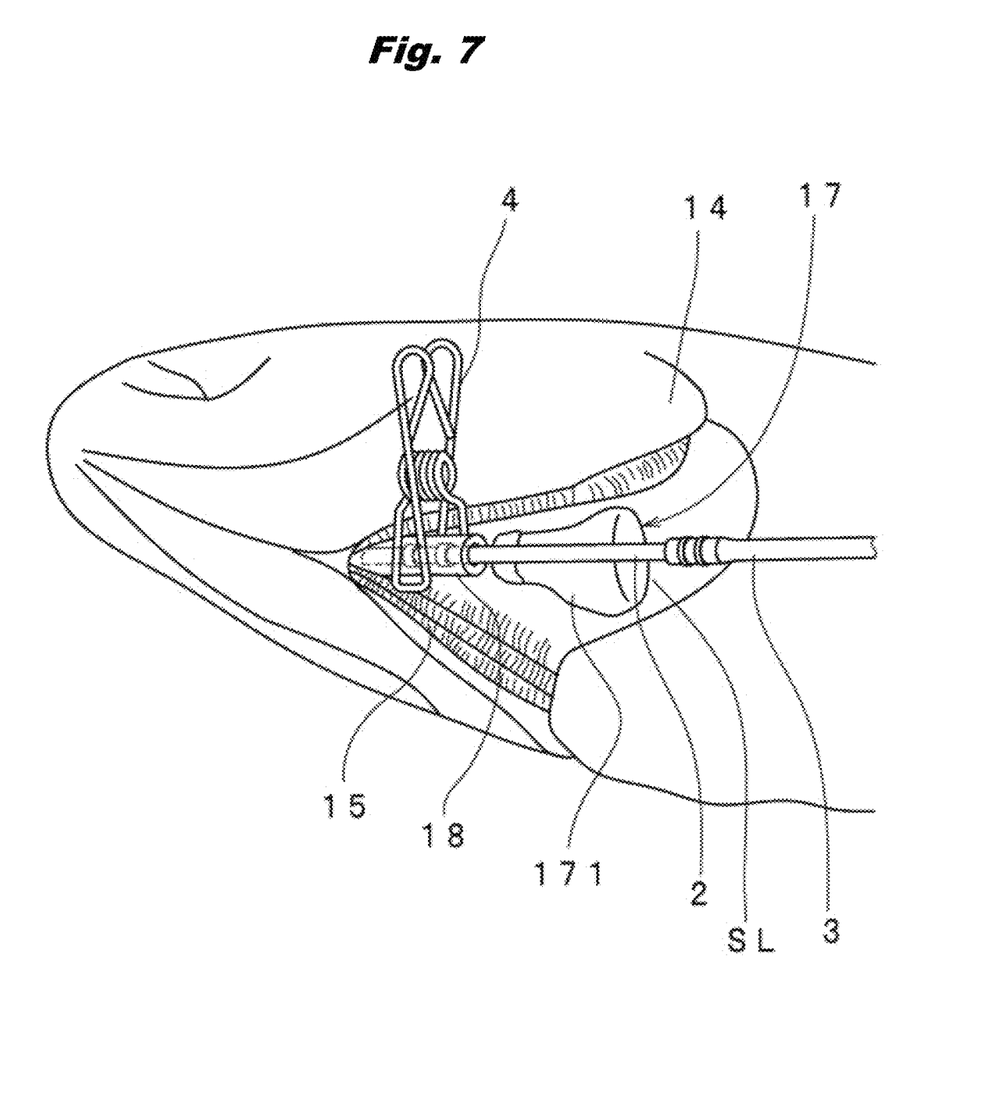
FIG. 7 is an explanatory diagram of the state upon completion of the third process with respect to an example of the third embodiment.

In the aforementioned second process, instead of piercing the injection needle 2 directly into the wall of the heart 17 or the arterial sphere 18, it is possible to open the slit SL to such an extent as to expose the vicinity of the border between the arterial sphere 18 and the heart 17, and as show in FIG. 7, cut the vicinity of the border (or border vicinity) between the arterial sphere 18 and the heart 17, then insert the injection needle 2 into the cut edge on the side of the arterial sphere 18. This way, the direction the injection needle 2 is inserted is from the cut edge towards the abdominal aorta 19, and the liquid will naturally be press fit in the direction of the blood flow in the aforementioned fourth process. Further, with this method, the tip of the tubular instrument does not necessarily have to be sharp, hence there is no risk of damaging the arterial sphere 18 or the abdominal aorta 19 beyond it with the tip of the tubular instrument. For this reason, failures in which liquid leaks from the damaged locations of the vascular system when press fitting the liquid, not transmitting enough pressure, and blood not discharging sufficiently, can be avoided. Moreover, it will be possible to discharge the blood more efficiently because the discharge spout of the blood will be wider.

(About the Liquid to Press Fit)

For the liquid to press fit into the fish's vascular system, antioxidants, which suppress deterioration or discoloration by oxidation, anticoagulants, which ensures smooth distribution of press fit liquid into the blood vessels including the capillaries, washing soap, sanitizing agent, spice, which suppress the fishiness distinctive of fish's flesh, nutritional supplements, or an appropriate combination of various food additives as seasonings such as UMAMI ingredients and sweeteners can be used (Refer to Japanese Laid-Open Patent Application Publications:JP2019-122292, paragraphs [0022]-[0027], JP H09-149761, paragraph [0019]).

For naturally derived ingredients, for example, extracts of types of citrus fruits such as clementine, yuzu, sudachi, kabosu, oranges, lemons, limes, grapefruits; spice ingredients such as wasabi, ginger, chili peppers, peppers, Japanese peppers; types of herb such as peppermint, spearmint, shiso, rosemary, sage, tea plant can be listed as antioxidants, spice, fruit juice, and nutritional supplements. Also, seaweed extracts contain glutamic acid, which is the UMAMI ingredient, as well as a rich amount of dietary fiber such as sodium alginate, carrageenan and fucoidan, hence can be combined as nutritional supplements and seasonings.

Other examples of possible ingredients which can be combined to the press fit liquid will be described below.

Antioxidants . . . Antioxidant vitamins such as vitamin C (ascorbic acid) and vitamin E (α-tocopherol); antioxidant polyphenols such as epigallocatechin gallate, catechin, epicatechin, epigallocatechin, epicatechin gallate, quercetin, hesperidin, pterostilbene, proanthocyanidin, carnosic acid; antioxidant carotenoid such as βcarotene, vitamin A, lycopene, lutein, astaxanthin; antioxidant peptide such as glutathione; types of antioxidant sugar such as isomaltulose; synthetic antioxidants such as butylhydroxyanisole; others such as uric acid, melatonin, urobilinogen.

Spice . . . citral, piperidine, pyrazine, types of terpene hydrocarbon, types of isothiocyanate, and the like Nutritional supplements . . . essential fatty acids such as docosahexaenoic acids, eicosapentaenoic acids, alinolenic acids, arachidonic acids, γ-linolenic acids; types of vitamins such as vitamin A, vitamin B, vitamin C, vitamin D, vitamin E, vitamin H, vitamin K, vitamin P, vitamin U, cobalamin; types of minerals such as zinc, iron, copper, chromium, selenium, magnesium, calcium, potassium, sodium, cobalt, molybdenum; types of amino acids such as tryptophan, threonine, leucine, isoleucine, lysine, methionine, phenylalanine, histidine, asparagine, serine, proline, glutamine, tyrosine, γ-aminobutyric acids, taurine.

Seasonings . . . typical household seasonings such as sugar, salt, vinegar, soy sauce, sake, mirin; UMAMI ingredients such as glutamic acids, inosinic acids, guanylic acids; sweeteners such as xylitol, saccharin.

Anticoagulants . . . sodium citrate and the like

Washing soap . . . electrolyzed alkaline water with strong alkaline and the like.

Sanitizing agent . . . electrolyzed acidic water with strong acidity and the like.

When using electrolyzed acidic water with strong acidity, which is a sanitizing agent, it can be performed by immersing the fish in electrolyzed alkaline water with strong alkaline. This way, a meticulous and complicated structure which make up the gill will be sufficiently exposed to the electrolyzed acidic water, and will be sufficiently sanitized. Also, prior to injecting electrolyzed acidic water, which is a sanitizing agent, into the heart or inside the blood vessels of the fresh fish, electrolyzed alkaline water with strong alkaline may be injected into the heart or inside the blood vessels. This way, inside of the blood vessels of the fresh fish will be sufficiently washed with the electrolyzed alkaline water, which will further enhance the sanitizing effect of the electrolyzed acidic water, as well as almost all of the smell which derives from the blood remaining inside the blood vessels of the said fresh fish will be removed (Refer to Japanese Laid-Open Patent Application Publication JP2005-151875, paragraphs [0009]-[0014]).

Further, liquid in which hydrogen or oxygen has been dissolved or decomposed can be used. In case of hydrogen, by dissolving or decomposing hydrogen so that the liquid's hydrogen concentration is in the range of 0.7-1.6 mg/L, hydrogen, which is a superior reducing agent, will run through the fish's vascular system, which will suppress oxidation of the fish's body tissue, enabling to further enhance maintaining freshness of the fish. In case of oxygen, by having the oxygen concentration of the press fitting liquid higher than the oxygen concentration of the fresh fish's blood, the time until the fish stiffens after death will be delayed as well as suppress production of lactic acid, enabling to further enhance maintaining freshness of the fish (Refer to Japanese Laid-Open Patent Application Publication: JP2010-104356, paragraph [0048]).

(The Yellowtail 1 after Bleeding)

With regard to the yellowtail 1 after bleeding according to the aforementioned examples of the first-third embodiments, the yellowtail 1's head and abdomen are cut alongside the outer edge of the gill 15. More specifically, the membrane 16 under the gill 15 is slit alongside the cutting line CL shown in the dash-dotted line in FIG. 2, as well as the part of the flesh which connects the yellowtail 1's head and the abdomen is cut (or split) without damaging the abdominal aorta 19. As such, as shown in FIG. 3, slit SL, which connects the pericardial cavity 11 to the outer side of the fish, is formed.

Here, the flesh part of the yellowtail 1 is cut so that a connecting point (inside the fish's body) of slit SL with the pericardial cavity 11 is within a range on the head side rather than the diaphragm 13. Further, the formed slit SL can be opened so that the caudal side surface of the heart 17's ventricle 171 is exposed. If the abdominal side of the flesh is lifted up in order to open the slit SL, the arterial sphere 18 will not be pulled up together with it attached inside the flesh.

Further, in the embodiment shown in the aforementioned example of the first embodiment, there is a piercing mark of the injection needle 2 on the caudal side surface of the heart 17's ventricle 171, also, in the embodiment shown in the aforementioned example of the second embodiment, there is a piercing mark of the injection needle 2 on the arterial sphere 18. In the embodiment shown in the aforementioned example of the third embodiment, the vicinity of the border between the arterial sphere 18 and the heart 17 is cut.

Moreover, the yellowtail 1 after bleeding according to the aforementioned examples of the first-third embodiments is in the state of a round fish, and the blood inside the vascular system is replaced with the aforementioned press fit liquid, and the vascular system is filled with the said press fit liquid. Therefore, the said yellowtail 1 after bleeding can achieve efficacy (or advantage) of bleeding in which the fish is in the state of a round fish, the color of the fish's flesh become better (whitens), reduces fishiness and is superior in maintaining freshness, as well as manifest efficacy corresponding to the characteristic of the press fit liquid.

(Function Effect)

In the present invention, as shown in the aforementioned examples of the embodiments, in order to press fit liquid in the vascular system and perform bleeding by cutting only the pericardial cavity, a round fish in which sufficient blood has been removed can be provided. Hence, a round fish with reduced fishiness superiority in maintaining freshness can be provided.

INDUSTRIAL AVAILABILITY

The present invention is especially suitable for use in farmed fish such as Red Seabream, Greater Amberjack, Yellowtail, and Japanese Amberjack which are distributed in the form of round fish.

LEGENDS

1 . . . Yellowtail
11 . . . Pericardial Cavity
12 . . . Abdominal Cavity
13 . . . Diaphragm
14 . . . Gill Cover
15 . . . Gill
16 . . . Membrane
17 . . . Heart
171 . . . Ventricle
18 . . . Arterial Sphere
19 . . . Abdominal Aorta
2 . . . Injection Needle
21 . . . Protrusion(s)
3 . . . Tube
4 . . . Pinch
SL . . . Slit
CL . . . Cutting Line

What is claimed is:

1. A bleeding method for a fish, comprising:
   step of forming a slit that connects a pericardial cavity to an outer part of the fish by cutting a membrane of gill to split a head and an abdomen such that an abdominal aorta is not cut and internal organs incorporated in an abdominal cavity are not exposed to an outside air,
   step of spreading the slit such that an arterial sphere of the fish is not pulled up together with a fresh on an abdominal side being lifted, and a caudal side surface of a ventricle in a heart of the fish is exposed,
   step of inserting a tubular instrument in the heart of the fish, which runs through the slit from the caudal side surface of the ventricle toward the arterial sphere,
   step of fixing the tubular instrument to the heart, and
   step of discharging blood of the fish outside by press-fitting liquid into vascular system of the fish via the tubular instrument.

2. The bleeding method for the fish according to claim 1, wherein
   the step of cutting the slit further includes a step of cutting a part of fresh connecting the head and the abdomen such that the slit and the pericardial cavity is connected within a range on a head side rather than a diaphragm, which separates the pericardial cavity from the abdominal cavity.

3. A round fish, which is processed by the bleeding method according to claim 2.

4. The bleeding method for the fish according to claim 1, wherein
   the press-fit liquid is adjusted of which a salt concentration is in a range of 1.8 to 2.2 wt %.

5. The bleeding method for the fish according to claim 1, wherein
   the press-fit liquid has a hydrogen concentration that is in a range of 0.7 to 1.6 mg/L.

6. The bleeding method for the fish according to claim 1, wherein
   the press-fit liquid includes at least one selected from antioxidant, washing soap, sanitizing agent, anticoagulant, spice, fruit juice, nutritional supplement and food additive.

7. A round fish, which is processed by the bleeding method according to claim 1.

8. A bleeding method for a fish, comprising:
   step of forming a slit that connects a pericardial cavity to an outer part of the fish by cutting a membrane of gill to split a head and an abdomen such that an abdominal aorta is not cut and internal organs incorporated in an abdominal cavity are not exposed to an outside air,
   step of spreading the slit such that an arterial sphere of the fish is not pulled up together with a fresh on an abdominal side being lifted, and the arterial sphere of the fish is exposed,
   step of piercing a tubular instrument in the arterial sphere of the fish in a direction of blood flow via the slit spread,
   step of fixing the tubular instrument to the arterial sphere, and
   step of discharging blood of the fish outside by press-fitting liquid into vascular system of the fish via the tubular instrument.

9. The bleeding method for the fish according to claim 8, wherein
   the step of cutting the slit further includes a step of cutting a part of fresh connecting the head and the abdomen such that the slit and the pericardial cavity is connected within a range on a head side rather than a diaphragm, which separates the pericardial cavity from the abdominal cavity.

10. A round fish, which is processed by the bleeding method according to claim 8.

11. A bleeding method for a fish, comprising:
    step of forming a slit that connects a pericardial cavity to an outer part of the fish by cutting a membrane of gill to split a head and an abdomen such that an abdominal aorta is not cut and internal organs incorporated in an abdominal cavity are not exposed to an outside air,
    step of spreading the slit such that an arterial sphere of the fish is not pulled up together with a fresh on an abdominal side being lifted, and a border vicinity between the arterial sphere and a heart of the fish is exposed,
    step of cutting the border vicinity between the arterial sphere and the heart of the fish, and inserting a tubular instrument from a cut edge of the arterial sphere, which is created by the cutting, toward the abdominal aorta via the slit, which is spread, step of fixing the tubular instrument to the arterial sphere, and step of discharging blood of the fish outside by press-fitting liquid into vascular system of the fish via the tubular instrument.

12. The bleeding method for the fish according to claim 11, wherein the step of cutting the slit further includes a step of cutting a part of fresh connecting the head and the abdomen such that the slit and the pericardial cavity is connected within a range on a head side rather than a diaphragm, which separates the pericardial cavity from the abdominal cavity.

13. A round fish, which is processed by the bleeding method according to claim 11.

\* \* \* \* \*